Figure 1:
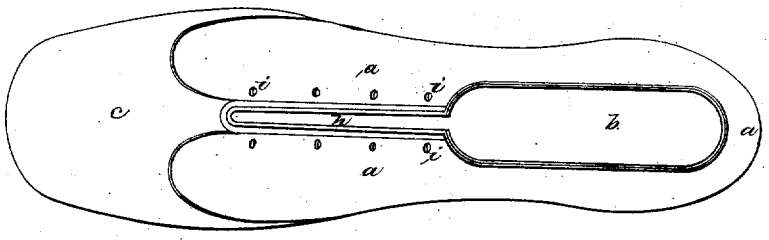

T. C. Wales,
Rubber Shoes.

No. 2,298. Reissued June 26, 1866.

N. PETERS, PHOTO-LITHOGRAPHER, WASHINGTON, D. C.

UNITED STATES PATENT OFFICE.

THE GOODYEAR METALLIC RUBBER SHOE COMPANY, OF NAUGATUCK, CONNECTICUT, ASSIGNEES OF THOMAS C. WALES.

WATER-PROOF GAITER SHOES AND BOOTS.

Specification forming part of Letters Patent No. 19,269, dated February 2, 1858; Reissue No. 2,298, dated June 26, 1866.

*To all whom it may concern:*

Be it known that THOMAS C. WALES, of Dorchester, in the county of Suffolk and State of Massachusetts, did invent an Improvement in Water-Proof Gaiter Shoes and Boots, of which the following is a specification.

This invention relates to an improvement in the construction of water-proof shoes, the object being to produce a shoe having the appearance of a common leather and cloth gaiter boot or shoe, and yet water-proof in all its parts; and consists in forming the sole and foxing of india-rubber upon a lined or double-cloth top or body made water-proof by the introduction of rubber gum between the outer cloth and the lining, which serves to secure the two together, and the whole secured together and finished by the process known as vulcanizing; and in order that others skilled in the art may be enabled to construct water-proof shoes in accordance with this invention, we will proceed to fully describe our manner of so doing.

For the upper or outer surface of cloth we prefer that which has the appearance of felt, but the kind of cloth is immaterial to the invention, and for the inner or lining we prefer a flannel, or material having a long nap or woolly surface. The meeting surfaces of the outer cloth and lining are coated with rubber while in a plastic state, and in the ordinary manner, as for vulcanizing. This coating may be done before or after the cloth is cut to the pattern required for the shoe to be produced. As represented in the drawings, the outer surface of the cloth overlaps the upper edge of the foxing. This construction we will first describe.

Figure 2:
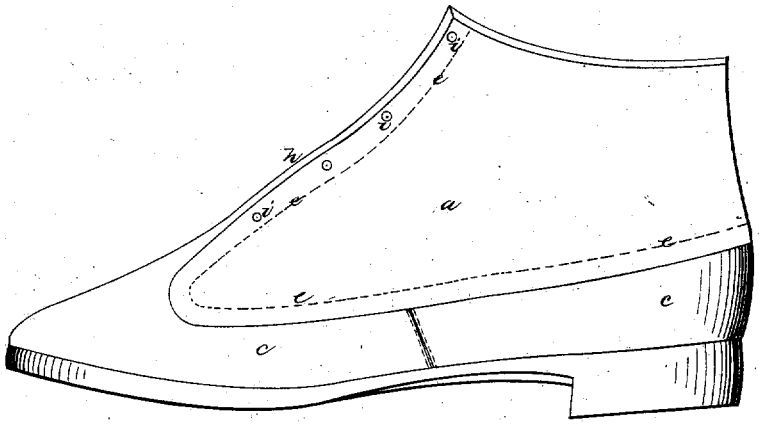
Figure 3:
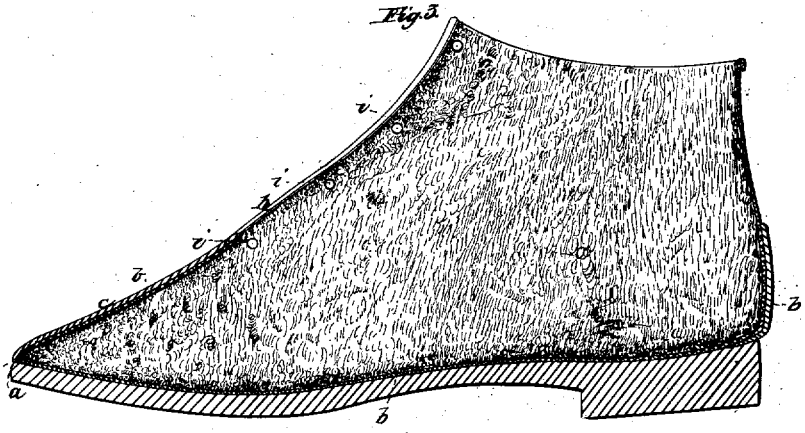
Figure 4:
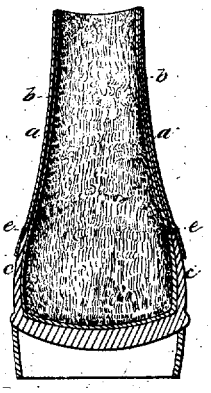

The lining *b* is cut to the proper form to cover the interior of the shoe. The outer layer, *a*, of cloth is cut to the form required, and so as to overlap the upper edge of the foxing *c*, as denoted in the drawings, the dotted line *e*, Figure 2, denoting the upper edge of the foxing. The pattern to which these parts are cut may be in accordance with the taste of the manufacturer or the demands of the market. The foxing and sole are made, in the usual manner, of rubber prepared for vulcanizing. The lining is placed upon the last, the sole and foxing thereon, and over all the outer layer of cloth, the gummed surfaces causing the outer surface of cloth to adhere to the lining and at its lower edge to the foxing. Thus prepared, the whole shoe is subjected to the common vulcanizing process, or to a heat of 270° Fahrenheit, which completes the shoe.

As thus described, the outer surface of cloth overlaps the foxing. This is not essential, as, if preferred, in cutting out the cloth the outer surface may be cut the same as the lining, so as to extend down to the sole in like manner as does the lining. In this construction the lining is placed upon the last, as before described, then the outer surface or layer of cloth upon that, nearly or entirely covering the lining, then the sole and foxing, formed as before, placed over the outer cloth, and then vulcanized and finished, as before. This last construction leaves the edge of the rubber foxing upon the outer surface of the cloth. In some classes of work this, doubtless, would be the better plan.

Thus it will be seen that this construction differs materially from others heretofore followed in the manufacture of water-proof shoes, as in this operation all the parts of the shoe composed of cloth and rubber are secured together by india-rubber cement, and the outer surface to the lining by india-rubber between the two, and the whole protected and made perfect by the vulcanizing process.

We form an insole from the same or similar material as the lining, and gum it to the sole before vulcanizing.

This shoe is designed to be worn either as an overshoe or directly upon the foot. The manner of securing it upon the foot may be by lacing on the instep, as shown in the drawings, or otherwise.

We do not claim the vulcanizing process; neither do we claim making articles of cloth entire cemented together and afterward vulcanized; neither do we claim making shoes partly of leather and partly of cloth, whether made by uniting the leather to the cloth by water-proof cement or otherwise, as such cannot be vulcanized, owing to the fact that the great heat required would destroy the leather; but, Having fully set forth and described this invention, what we claim as the invention of the aforesaid THOMAS C. WALES, is—

A new or improved manufacture or waterproof vulcanized-rubber and cloth gaiter-shoe made in manner, and with its external layer of cloth and its lining of cloth arranged together, and with respect to the remainder or rubber parts or foxing, substantially as specified.

GOODYEAR METALLIC RUBBER SHOE CO.,
*Assignees of Thos. C. Wales,*
By GEO. H. SCRANTON, *Treasurer.*

Witnesses:
JOHN E. EARLE,
E. HEATON.